(12) United States Patent
Spindler et al.

(10) Patent No.: US 12,533,915 B2
(45) Date of Patent: Jan. 27, 2026

(54) DEVICE FOR TRANSMITTING COMPRESSED AIR OR CONTROL AND/OR WORKING PRESSURES IN A CARDAN SHAFT ARRANGEMENT

(71) Applicants: ILLINOIS TOOL WORKS INC., Glenview, IL (US); KT PROJEKTENTWICKLUNGS GMBH, Heilbronn (DE)

(72) Inventors: Martin Spindler, Herdwangen-Schönach (DE); Andreas Haering, Owingen (DE); Bruno Schulze Selting, Rielasingen-Worblingen (DE); Erwin Braun, Owingen (DE)

(73) Assignee: Illinois Tool Works Inc., Glenview, IL (US)

( * ) Notice: Subject to any disclaimer, the term of this patent is extended or adjusted under 35 U.S.C. 154(b) by 753 days.

(21) Appl. No.: 17/865,669

(22) Filed: Jul. 15, 2022

(65) Prior Publication Data

US 2023/0023313 A1    Jan. 26, 2023

(30) Foreign Application Priority Data

Jul. 21, 2021   (DE) .................... 10 2021 118 902.0

(51) Int. Cl.
*B60C 23/00*    (2006.01)
(52) U.S. Cl.
CPC .. *B60C 23/00336* (2020.05); *B60C 23/00345* (2020.05); *B60C 23/00363* (2020.05)

(58) Field of Classification Search
CPC ........ B60C 23/00336; B60C 23/00345; B60C 23/00363; B60C 23/003
See application file for complete search history.

(56) References Cited

U.S. PATENT DOCUMENTS

| | | | |
|---|---|---|---|
| 7,992,610 B2 * | 8/2011 | Collet | B60C 23/00345 152/417 |
| 8,371,350 B2 * | 2/2013 | Collet | B60C 23/00336 152/417 |

(Continued)

FOREIGN PATENT DOCUMENTS

| | | |
|---|---|---|
| DE | 10 2010 001 345 B4 | 9/2013 |
| DE | 10 2012 217 040 A1 | 3/2014 |

(Continued)

*Primary Examiner* — Jason R Bellinger
(74) *Attorney, Agent, or Firm* — McAndrews, Held & Malloy, Ltd.

(57) ABSTRACT

A rotation transmission apparatus for transmitting control and/or working pressures to a fluid channel, which is at least regionally configured or accommodated on or in a shaft, in particular a drive shaft, wherein the rotation transmission apparatus includes a stator assembly, which is arranged such that it is stationary relative to a rotational movement of the shaft and has at least one fluid supply/discharge line, wherein the fluid supply/discharge opens into an annular space which surrounds the shaft at least partially and with which the fluid channel of the shaft is fluidically connected via a branch channel, wherein the annular space is associated with sealing elements, which are arranged and configured in the annular space at least partially such that they seal the annular space from the outside atmosphere when a previously defined or definable overpressure is applied in the annular space.

20 Claims, 4 Drawing Sheets

(56) References Cited

U.S. PATENT DOCUMENTS

| | | | | |
|---|---|---|---|---|
| 8,915,274 B2 * | 12/2014 | Eschenburg | ...... | B60C 23/00363 |
| | | | | 152/416 |
| 11,498,411 B2 * | 11/2022 | Frey | ................. | B60C 23/00354 |
| 2011/0180192 A1 | 7/2011 | Stech | | |

FOREIGN PATENT DOCUMENTS

| | | |
|---|---|---|
| DE | 10 2014 102 633 A1 | 8/2015 |
| DE | 10 2016 208 697 A1 | 11/2017 |
| DE | 10 2019 112 320 A1 | 11/2020 |
| EP | 0 075 723 A1 | 4/1983 |

* cited by examiner

DEVICE FOR TRANSMITTING COMPRESSED AIR OR CONTROL AND/OR WORKING PRESSURES IN A CARDAN SHAFT ARRANGEMENT

CROSS-REFERENCE TO RELATED APPLICATION

German Patent Application No. DE 10 2021 118 902.0, filed 21 Jul. 2021, the priority document corresponding to this invention, to which a foreign priority benefit is claimed under Title 35, United States Code, Section 119, and its entire teachings are incorporated, by reference, into this specification.

BACKGROUND OF THE INVENTION

Field of the Invention

The present invention relates generally to a system for transmitting control and/or working pressures or pressurized media in particular in a drive shaft having a rotatably supported vehicle tire.

Discussion of Related Art

According to embodiments of the invention, it relates in particular to a rotation transmission apparatus for transmitting control and/or working pressures or pressurized media to a fluid channel accommodated or formed at least regionally on or in a shaft, in particular a drive shaft.

According to a further aspect, the invention relates to a system having such a rotation transmission apparatus and a shaft on which the rotation transmission apparatus is fastened, wherein the shaft is in particular embodied as a drive shaft of a vehicle.

The invention furthermore relates to a tire pressure adjustment system for at least one wheel of a wheeled vehicle, driven rotationally relative to a vehicle body, having pneumatic tires and comprising at least one drive shaft for driving the wheel, wherein a fluid channel is accommodated or formed in the interior of the drive shaft, and wherein at least one rotation transmission apparatus is provided for supplying and/or discharging a pressurized fluid to or from the fluid channel accommodated or formed in the drive shaft, as needed.

SUMMARY OF THE INVENTION

Vehicle tires are typically filled with compressed air. Filling with other pressurized media is also conceivable, for example with nitrogen. Vehicle tires in the sense of the present disclosure can be, for example, tubed or tubeless tires. Vehicle tires are used in passenger vehicles, buses, commercial vehicles, and also in aircraft, for example.

Conventional vehicle tires are typically supplied with a pressurized media via external connections, i.e., with compressed air or with a nitrogen filling. Standard valves are commonly used for this purpose. Depending on the respective usage and operating conditions, vehicle tires typically have one optimal operating/filling pressure. For example, for land vehicles such as cars, buses, and trucks, there are operating pressures or pressure ranges that can ensure the most optimum possible rolling resistance, lateral guidance, longitudinal guidance, heat generation, and/or wear behavior.

For example, an existing actual pressure in a tire can fluctuate within certain limits as a function of the ambient or operating temperature. Furthermore, in the long term, a certain pressure drop, such as a so-called "creeping" pressure drop, often cannot be entirely avoided. Systems for vehicles are known that permit monitoring of the operating/filling pressure in tires. These can be so-called active or passive systems. For example, passive systems can be designed in order to determine and compare the rolling circumferences of the tires of one axle. If significant differences are found, this indicates that there are pressure differences in the respective tires. Active systems for measuring and/or monitoring compressed air typically include sensors for pressure sensing that are integrated in a wheel assembly. Such pressure sensors can be configured, for example, in order to transmit corresponding pressure signals wirelessly or wired from the (rotating) tire to fastened components of the vehicle.

Furthermore, systems have generally become known that enable a self-sufficient adjustment of the filling pressure of vehicle tires. Such systems can be found in off-road vehicles, military vehicles, and similar special purpose vehicles, for example. The systems can, in principle, be configured in order to allow for an adjustment of the filling pressure in the idling state of the vehicle, i.e., when the vehicle is not moving.

Known systems for self-sufficient pressure regulation in vehicles have a central structure. In other words, this means that there is only one device for supplying the pressurized media for filling the tires. It is also conceivable to provide a few devices for supplying the pressurized media, for example in a combination of a tractor machine and a trailer or semi-trailer.

Nevertheless, such a central supply device for compressed air is provided for filling a plurality of wheel assemblies, in particular on different axles or shafts. For this purpose, the central compressed air/pressurized media supply unit is coupled to a plurality of wheel assemblies. Thus, the supply unit is usually fastened on the chassis side or on the body side or on the coachwork side of the vehicle. The supply unit can include, for example, a compressor or air compressor.

Starting from the supply unit, it is now necessary to lay a plurality of compressed air or pressurized media lines to the individual wheel assemblies. In doing so, a plurality of so-called rotary lead-throughs for the pressurized media lines must be regularly provided. This is due to the fact that the tires of the wheel assemblies are typically rotatably accommodated on axles of the vehicle.

By contrast to rotation transmission apparatuses, which serve to transmit control and/or working pressures or corresponding pressurized media from a fastened axle to a wheel assembly rotating relative to the axle, rotation transmission apparatuses for transmitting control and/or working pressures or for transmitting pressurized media to a rotating shaft, in particular a drive shaft, of a vehicle present particular challenges, because only a particularly small design space for the reception or integration of such rotation transmission apparatuses is available. This is particularly true for drive shafts that are provided with an articulated head in order to balance movements corresponding to a steering motion.

Typically, a rotary lead-through for transmitting control and/or working pressures or for transmitting pressurized media comprises a stator ring and a rotor ring, which are annularly installed, for example outside an axle body of the shaft. A rotary lead-through within the axle body has thus far been associated with high production costs and significant risks. This is true, for example, in off-road vehicles with all-wheel drive and external planetary gear trains. A failure of the rotary lead-through within the axle body would result in air entry into the axle housing, and the oil of the axle gear train could leak out of the gear train vent.

In order to increase the service life of the rotary lead-throughs and the operational safety of the tire pressure adjustment system, the tire pressure adjustment systems are increasingly being equipped with special switching valves on the wheels, which load the rotary lead-throughs with air pressure only during the adjustment process. Nevertheless, the service life of the rotary lead-throughs with larger diameters and conventional seals is to be assessed very critically, because, with increasingly large diameters, in addition to the sliding speeds the frictional torques in particular increase sharply.

In light of the foregoing, the problem of the invention is to further develop a rotation transmission apparatus of the type mentioned above, that is, a rotation transmission apparatus for transferring control and/or working pressures, and/or for transferring pressurized media to a fluid channel accommodated or formed at least regionally inside a shaft, in particular drive shaft, such that it is characterized by a high robustness and has as little impact on the vehicle as possible when not in use. Moreover, the rotation transmission apparatus is designed to be characterized by low wear propensity and pronounced longevity.

Accordingly, the present invention relates to a rotation transmission apparatus for transferring control and/or working pressures to a fluid channel formed or accommodated on or in a shaft, in particular a drive shaft.

The rotation transmission apparatus according to the invention is in particular characterized in that it comprises a stator assembly having at least one fluid supply/discharge arranged stationarily relative to a rotational movement of the shaft, wherein the fluid supply/discharge opens into an annular space at least partially or regionally surrounding the shaft, with which the fluid channel of the shaft is preferably fluidically connected via a branch channel. The annular space has associated sealing elements, which are arranged at least partially or regionally in the annular space and are configured to seal the annular space from the outside atmosphere when (and preferably only when) a particularly previously defined or definable overpressure is applied in the annular space (opposite the atmospheric pressure).

The rotation transmission apparatus according to the invention is characterized by its simple construction, coupled with a high robustness, wherein the rotation transmission apparatus does not affect the vehicle when not in use. In addition, the rotation transmission apparatus according to the invention is characterized by low wear propensity and pronounced longevity.

According to preferred realizations of the rotation transmission apparatus according to the invention, the sealing elements associated with the annular space comprise at least one radial shaft sealing ring, in particular having a radially arranged sealing lip or sealing disc, in order to seal the annular space as needed. The shaft seal preferably consists of a rubber cuff, a metallic stiffener ring, and an annular coil tension spring, such that the shaft seal is self-centering.

Preferably, the at least one radial shaft sealing ring comprises an outer region facing the stator assembly and an inner region facing the shaft, wherein the radial shaft sealing ring is preferably exchangeable via its outer region and is connected to the stator assembly, in particular via a clamping connection. Due to the annular coil tension spring of the shaft seal, the inner region of the shaft sealing ring facing the shaft is preferably centered independently.

In particular, according to realizations of the rotation transmission apparatus according to the invention, it is provided that the inner region of the radial shaft sealing ring facing the shaft is configured at least regionally as a sealing lip or sealing disc running radially around the shaft, which bears or can be brought to bear against a sealing sleeve fastened to the shaft.

In this context, it is expedient that the sealing geometry of the sealing sleeve comprises at least one region radially running around the shaft and projecting or protruding towards the sealing space. This region, which projects or protrudes in the direction of the annular space, forms a sealing seat for the sealing lip or sealing disc of the radial shaft sealing ring.

In particular, the sealing lip or sealing disc is implemented and/or arranged in the annular space such that, when the annular space is unpressurized, it has no contact to the sealing geometry of the sealing sleeve or only bears against the sealing geometry of the sealing sleeve of the shaft so lightly that, upon rotation of the shaft relative to the stator assembly, the sealing sleeve can slide over the sealing lip or sealing disc without resistance or at least substantially without resistance.

On the other hand, the sealing lip or sealing disc should be implemented and/or arranged in the annular space such that, when overpressure is applied in the annular space, it bears against the sealing geometry of the sealing sleeve of the shaft in a sealing manner.

According to preferred realizations of the rotation transmission apparatus according to the invention, it is provided that the sealing lip or sealing disc is configured such that it returns to its at least substantially contact-free state when a previously set overpressure in the annular space is released again. This can be realized, for example, by the aforementioned coil tension spring of the radial shaft sealing ring. Of course, other embodiments are also conceivable in this context.

According to embodiments of the rotation transmission apparatus according to the invention, it is provided that the sealing sleeve is pushed onto the shaft and is preferably releasably connected to the shaft in the region of the stator assembly. In this way, the rotation transmission apparatus can also be installed particularly easily at a later time. Preferably, sealing elements, in particular in the form of at least one O-ring, are provided in order to seal the connection between the sealing sleeve and the shaft accordingly.

Further, it is preferred that a rolling bearing assembly is provided, via which the shaft is fastened such that it can rotate relative to the stator assembly.

According to realizations of the rotation transmission apparatus, the stator assembly comprises a housing which at least partially or regionally surrounds the shaft and in which the rolling bearing assembly is at least regionally accommodated.

Further, it is preferred that the stator assembly comprises a clamping ring or fastening assembly for preferably releasably or exchangeably fastening the sealing elements to the stator assembly.

According to preferred further developments of the last mentioned aspect, the clamping or fastening assembly is associated with sealing elements, in particular O-rings, for sealing the fastening region of the sealing rings.

The invention further relates to a system having a rotation transmission apparatus of the previously described type according to the invention, wherein the system comprises a shaft on which the rotation transmission apparatus is fastened, and wherein the shaft is in particular embodied as a drive shaft of a vehicle.

The invention further relates to a tire pressure adjustment system for at least one wheel, driven rotationally relative to a vehicle body, of a wheeled vehicle having pneumatic tires and comprising at least one drive shaft for driving the wheel, wherein a fluid channel is accommodated or formed in the interior of the drive shaft, and wherein at least one rotation transmission apparatus of the previously described type according to the invention is provided for supplying and/or discharging a pressurized fluid to or from the fluid channel accommodated or formed inside the drive shaft, as needed.

BRIEF DESCRIPTION OF SEVERAL VIEWS OF THE DRAWINGS

An embodiment of a system having an exemplary embodiment of the rotation transmission apparatus according to the invention is described in further detail below, with reference to the accompanying drawings. The figures show.

DESCRIPTION OF PREFERRED EMBODIMENTS

Figure 1:
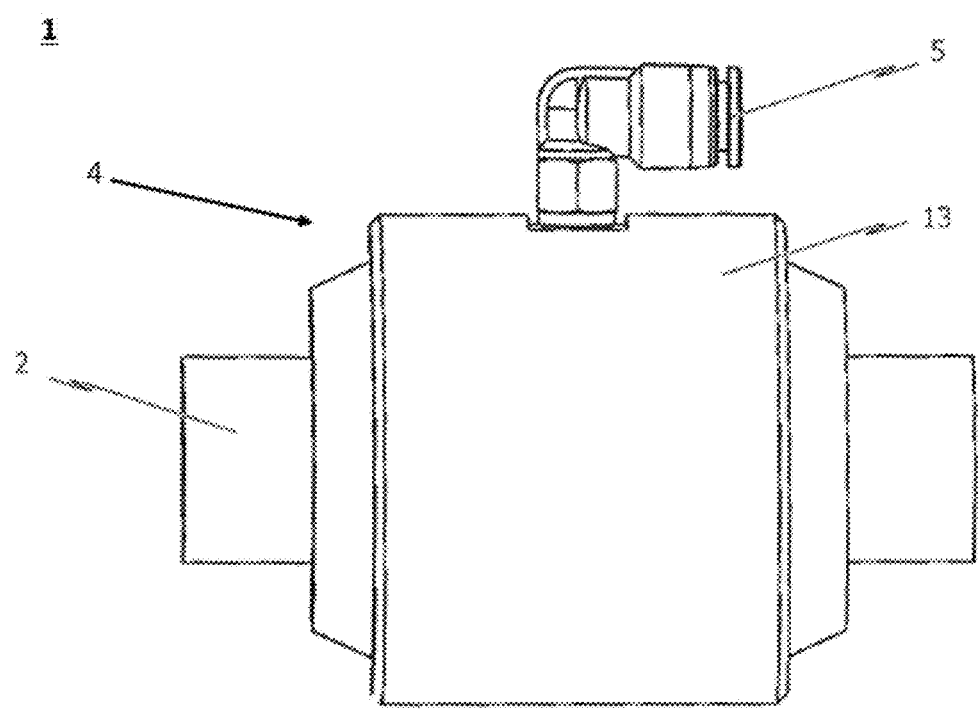
FIG. 1 shows in a schematically and in a lateral view, an exemplary embodiment of the rotation transmission apparatus according to the invention, being fastened on a shaft.

Referring now to the illustrations in FIG. 1 to FIG. 4, an exemplary embodiment of the rotation transmission apparatus 1 according to the invention will first be described, being fastened on a shaft 2, in particular a drive shaft.

The shaft 2 is, for example, a drive shaft of a wheel drive for a steered and driven vehicle wheel. The drive shaft can have a first gear-side shaft, a universal joint, and a second axle-side shaft. Because such a drive shaft requires the steering axle of the wheel to be as close as possible to the wheel plane so that the steering rolling radius is kept as low as possible, there is a certain space problem with respect to the rotation transmission apparatus 1.

In particular, it is therefore necessary for such drive shafts for a steered and driven vehicle wheel to provide a particularly compactly designed rotation transmission apparatus 1, which is configured to be as wear-free as possible.

The rotation transmission apparatus 1, as shown together with the shaft 2 in the drawings, can in particular be part of a tire pressure control system of a motor vehicle.

The rotation transmission apparatus 1 is fastened on and, in particular, torsionally connected to, the drive shaft 2. Although not shown, the drive shaft 2 can be circumscribed by an axle housing on the vehicle side. The axle housing can, at least regionally, form the housing 13 of a stator assembly 4 of the rotation transmission apparatus 1.

Although not shown in the drawings, the free portion of the shaft 2, i.e., the wheel-side end region of the shaft 2, can be connected to the wheel unit, which is also not shown in the drawings, via the already mentioned universal joint, and thus functions figuratively to secure one or more wheels on the drive shaft 2 so that they can be driven by the drive shaft 2.

The rotation transmission apparatus 1 serves to transmit control and/or working pressures to a fluid channel 3 accommodated or formed at least regionally inside the shaft 2. For this purpose, the rotation transmission apparatus 1 comprises a stator assembly 4, which is arranged in a stationary manner relative to a rotational movement of the shaft 2 and has at least one fluid supply/discharge 5.

Figure 2:
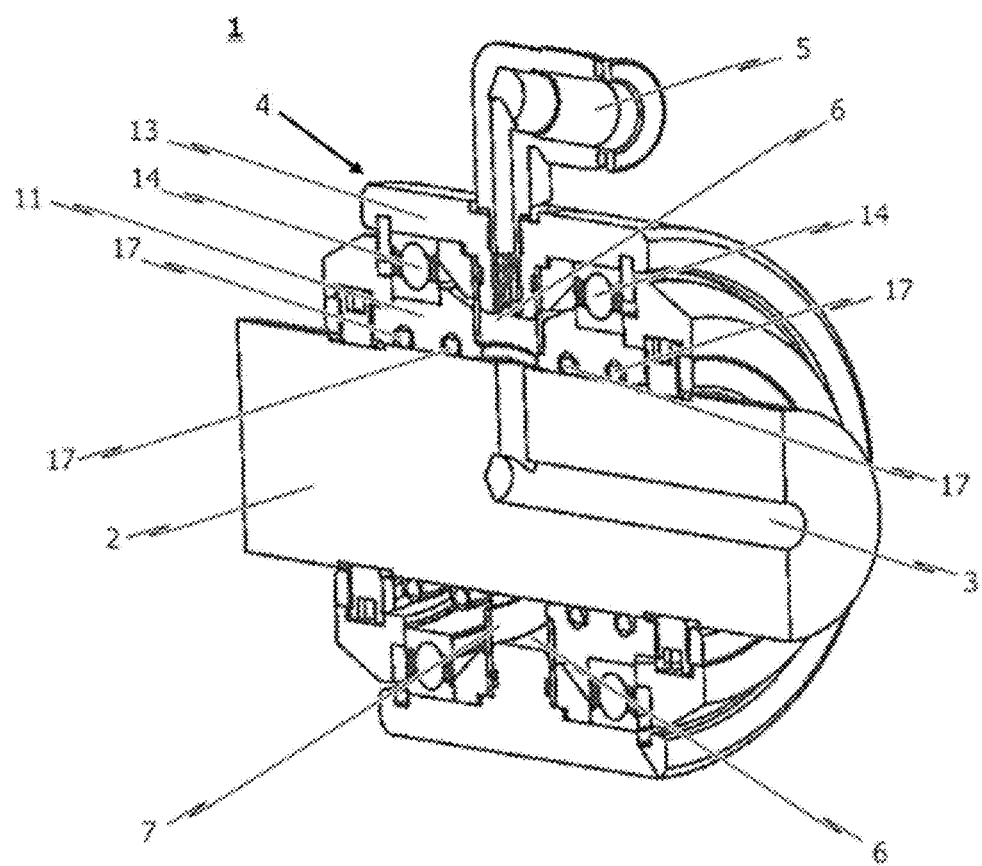
FIG. 2 show in a schematically and in an isometric longitudinal sectional view, the exemplary embodiment of the rotation transmission apparatus according to the invention according to FIG. 1.
Figure 3:
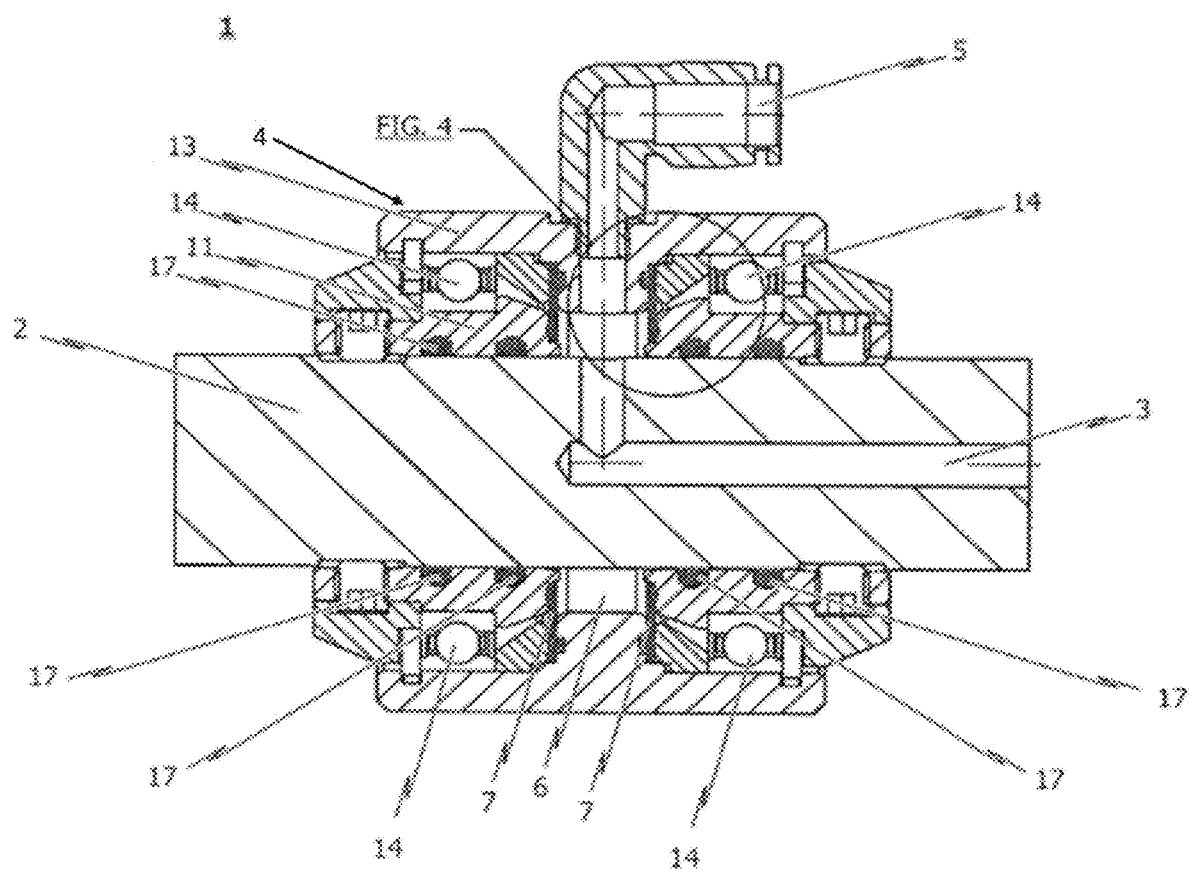
FIG. 3 shows in a schematically and in a longitudinal sectional view, the exemplary embodiment of the rotation transmission apparatus according to the invention according to FIG. 1.

As can in particular be seen from the sectional views in FIG. 2 and FIG. 3, the fluid supply/discharge 5 opens into an annular space 6 at least partially or regionally coaxially surrounding the shaft 2.

The fluid channel 3 of the shaft 2 is also fluidically connected to this coaxially arranged annular space 6, preferably via a branch channel.

Figure 4:
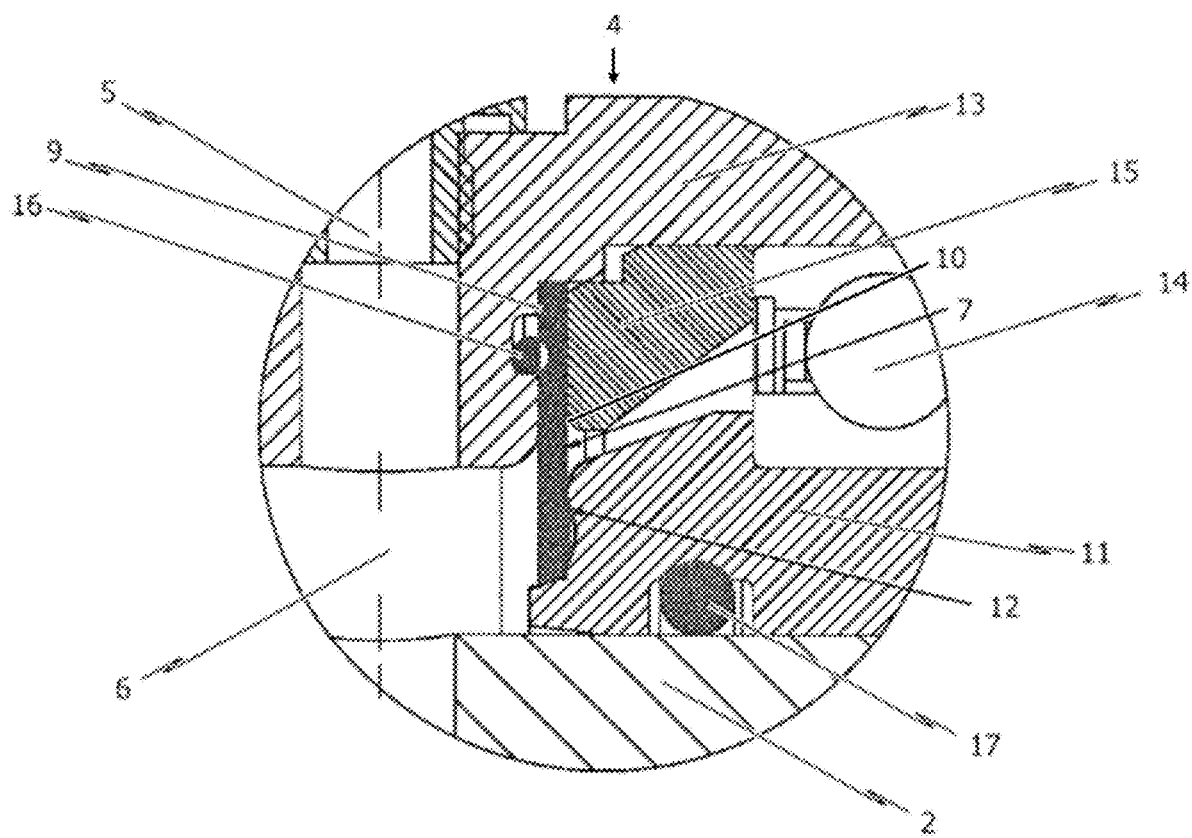
FIG. 4 shows schematically, a detailed view of FIG. 3.

As will be described in more detail below with reference to the detailed view in FIG. 4, sealing elements 7 are associated with the annular space 6, which are arranged and configured at least partially or regionally in the annular space 6 such that they seal the annular space 6 from the outside atmosphere when an in particular previously defined or definable overpressure is applied in the annular space 6.

The stator assembly 4 of the rotation transmission apparatus 1 comprises a housing 13 which at least partially or regionally surrounds the shaft 2 and in which a rolling bearing assembly 14 is at least regionally accommodated. With the aid of the roller bearing assembly 14, the shaft 2 is rotatably supported relative to the stator assembly 4.

At least regionally or partially in the housing 13 of the stator assembly 4, a sealing sleeve 11 is provided. Specifically, the sealing sleeve 11 is pushed onto the shaft 2 and is preferably releasably connected to the shaft 2 in the region of the housing 13 of the stator assembly 4. Sealing elements 17 are used in order to seal the connection between the sealing sleeve 11 and the shaft 2. The sealing elements 17 are in particular at least one O-ring.

The sealing sleeve 11 has a sealing geometry 12 facing in the direction of the annular space 6, against which, at least regionally, the sealing elements 7 arranged in the annular space 6 sealingly abut when an overpressure is applied in the annular space 6.

For example, the sealing geometry 12 of the sealing sleeve 11 can comprise at least one region running radially around the shaft 2 and projecting or protruding towards the annular space 6, which forms the sealing seat for the sealing elements 7.

Radial shaft sealing rings are used as sealing elements 7 in the exemplary embodiment shown in the drawings. Each radial shaft sealing ring has an outer region 9 facing the stator assembly 4 and an inner region 10 facing the shaft 2, wherein the inner region 10 facing the shaft 2 serves as a sealing lip or sealing disc. Each radial shaft sealing ring is preferably exchangeable via its outer region 9, and in particular connected to the stator assembly 4 via a clamping connection.

For this purpose, the stator assembly 4 comprises a clamping ring or fastening assembly 15 for releasably or exchangeably fastening the radial shaft sealing rings (sealing elements 7) to the stator assembly 4 via their outer region 9. Corresponding sealing elements 16, in particular in the form of O-rings, are associated with the clamping ring or fastening assembly 15 for sealing the fastening region of the sealing elements 7.

The inner regions 10 of the radial shaft sealing rings (sealing elements 7) facing the shaft 2 and configured as sealing lips or sealing discs are configured such that they bear or can be brought to bear against the sealing sleeve 11 fastened to the shaft 2.

Specifically, the sealing lips or sealing discs 10 of the radial shaft sealing rings (sealing element 7) are implemented and/or arranged in the annular space 6 such that, when the annular space 6 is unpressurized, they have no contact to the sealing geometry 12 of the sealing sleeve 11 or only bears against the sealing geometry 12 of the sealing sleeve 11 of the shall 2 so lightly that, upon rotation of the shaft 2 relative to the stator assembly 4, the sealing sleeve 11 can slide over the sealing lips or sealing discs 10 without resistance or at least substantially without resistance.

On the other hand, the sealing lips or sealing discs 10 of the radial shaft sealing rings (sealing element 7) are implemented and/or arranged in the annular space 6 such that, when overpressure is applied in the annular space 6, it bears against the sealing geometry 12 of the sealing sleeve 11 of the shaft 2 in a sealing manner.

Here, it is expedient that the sealing lips or sealing discs 10 are further configured such that they return to their at least substantially contact-free state when a previously set overpressure in the annular space 6 is released again.

Briefly summarized, the exemplary embodiment of the rotation transmission apparatus 1 according to the invention shown in the drawings can be characterized as follows:

In order to reduce wear and frictional losses to a minimum during operation of the rotation transmission apparatus 1, the rotation transmission apparatus 1 is configured such that the corresponding seal elements 7 in the annular space 6 engage with or come into contact with the sealing geometry 12 of the sealing sleeve 11 of the rotating drive shaft 2 relative to the stator assembly 4 only for the period of time of transfer of the pressurized medium to the fluid channel 3 formed in the shaft 2.

The drive shaft 2, which is embodied for example as a hollow or partially hollow shaft, can have any number of channel guides (fluid channels 3). Any fluid channel 3 of drive shaft 2 running parallel to the axis of rotation of drive shaft 2 can have any number of branch channels to the drive shall surface, wherein all branch channels located in the region of the stator assembly 4 "see" the same control pressure.

The outer contour (topology) of the drive shaft 2 is preferably created such that the drive shaft 2 has sealing portions in the region of transmission relative to the axis of rotation.

The described exemplary embodiment relates to a single-channel rotary feedthrough, but two-channel rotary feedthroughs with a working channel and a control channel are also conceivable. Similarly, the rotation transmission apparatus 1 can also be realized with more than two channels.

The description of the invention makes it clear that the rotation transmission apparatus 1 according to the invention is above all also suitable for retrofitting.

The invention is not limited to the embodiments shown in the drawings, but rather results when all of the features disclosed herein are considered together.

The invention claimed is:

1. A rotation transmission apparatus for transmitting control and/or working pressures to a fluid channel, which is configured or accommodated on or in a shaft, wherein the rotation transmission apparatus comprises:
   a stator assembly which is arranged such that the stator assembly is stationary relative to a rotational movement of the shaft and has at least one fluid supply/discharge line, wherein the fluid supply/discharge line opens into an annular space which surrounds the shaft at least partially and with which the fluid channel of the shaft is fluidically connected by a branch channel, wherein the annular space has associated sealing elements which are arranged and configured in the annular space at least partially such that the sealing elements seal the annular space from the outside atmosphere when a previously defined or definable overpressure is applied in the annular space, wherein the shaft is coupled to the stator assembly using a bearing assembly such that the shaft can rotate relative to the stator assembly.

2. The rotation transmission apparatus according to claim 1, wherein the sealing elements comprise at least one radial shaft sealing ring having a radially arranged sealing lip or sealing disc, for sealing the annular space.

3. The rotation transmission apparatus according to claim 2, wherein the at least one radial shaft sealing ring comprises an outer region facing the stator assembly and an inner region facing the shaft, wherein the radial shaft sealing ring is connected to the stator assembly by a clamping connection.

4. The rotation transmission apparatus according to claim 3, wherein the inner region or the radial shaft sealing ring facing the shaft is configured as a sealing lip or sealing disc which extends radially around the shaft and bears against a sealing sleeve fastened to the shaft.

5. The rotation transmission apparatus according to claim 4, wherein the sealing sleeve has a sealing geometry, wherein the sealing geometry comprises at least one region which extends radially around the shaft and projects or protrudes in the direction of the annular space.

6. The rotation transmission apparatus according to claim 4, wherein the sealing lip or sealing disc is arranged in the annular space such that, when the annular space is unpressurized, the sealing lip or sealing disc has no contact with the sealing geometry of the sealing sleeve or only bears against the sealing geometry of the sealing sleeve of the shaft in a way such that, upon rotation of the shaft relative to the stator assembly, the sealing sleeve can slide over the sealing lip or sealing disc without resistance or at least substantially without resistance.

7. The rotation transmission apparatus according to claim 4, wherein the sealing lip or sealing disc is arranged in the annular space such that, when overpressure is applied in the annular space, the sealing lip or sealing disc bears against the sealing geometry of the sealing sleeve of the shaft in a sealing manner.

8. The rotation transmission apparatus according to claim 4, wherein the sealing lip or sealing disc is configured such that the sealing lip or sealing disc returns to an at least substantially contact-free state when a previously set overpressure in the annular space is released again.

9. The rotation transmission apparatus according to claim 4, wherein the sealing sleeve is pushed onto the shaft and is releasably connected to the shaft in the region of the stator assembly, wherein sealing elements, in the form of at least one O-ring provided for sealing the connection between the sealing sleeve and the shaft.

10. The rotation transmission apparatus according to claim 1, wherein the stator assembly comprises a housing which at least partially surrounds the shaft and in which a bearing assembly is accommodated.

11. The rotation transmission apparatus according to claim 1, wherein the stator assembly comprises a clamping ring or fastening assembly for releasably fastening the sealing elements to the stator assembly.

12. The rotation transmission apparatus according to claim 11, wherein sealing elements, in the form of at least one O-ring, are associated with the clamping ring or fastening assembly for sealing a fastening region of the sealing elements.

13. The rotation transmission apparatus according to claim 1, further comprising a shaft on which the rotation transmission apparatus is fastened, wherein the shaft is as a drive shaft of a vehicle.

14. A rotation transmission apparatus for transmitting control and/or working pressures to a fluid channel, which is configured or accommodated on or in a shaft, wherein the rotation transmission apparatus comprises:
   a stator assembly which is arranged such that the stator assembly is stationary relative to a rotational movement of the shaft and has at least one fluid supply/discharge line, wherein the fluid supply/discharge line opens into an annular space which surrounds the shaft at least partially and with which the fluid channel of the shaft is fluidically connected by a branch channel, wherein the annular space has associated sealing elements which are arranged and configured in the annular space at least partially such that the sealing elements seal the annular space from the outside atmosphere when a previously defined or definable overpressure is applied in the annular space,
      wherein the sealing elements comprise at least one radial shaft sealing ring having a radially arranged sealing lip or sealing disc, for sealing the annular,
      wherein the at least one radial shaft sealing ring comprises an outer region facing the stator assembly and an inner region facing the shaft, wherein the radial shaft sealing ring is connected to the stator assembly by a clamping connection,
      wherein the inner region of the radial shaft sealing ring facing the shaft is configured as a sealing lip or sealing disc which extends radially around the shaft and bears against a sealing sleeve fastened to the shaft,
      wherein the sealing sleeve has a sealing geometry, wherein the sealing geometry comprises at least one region which extends radially around the shaft and projects or protrudes in the direction of the annular space, and
      wherein the sealing lip or sealing disc is arranged in the annular space such that, when the annular space is unpressurized, the sealing lip or sealing disc has no contact with the sealing geometry of the sealing sleeve or only bears against the sealing geometry of the sealing sleeve of the shaft in a way such that, upon rotation of the shaft relative to the stator assembly, the sealing sleeve can slide over the sealing lip or sealing disc without resistance or at least substantially without resistance.

15. A rotation transmission apparatus for transmitting control and/or working pressures to a fluid channel, the rotation transmission apparatus comprising:
   a stator assembly arranged such that the stator assembly is stationary relative to a rotational movement of a shaft and has at least one fluid supply/discharge line,
      wherein the fluid supply/discharge line is opens into an annular space that surrounds the shaft at least partially and with which the fluid channel of the shaft is fluidically connected by a branch channel, and
      wherein sealing elements are arranged and configured in the annular space at least partially such that the sealing elements seal the annular space from the outside atmosphere when a previously defined or definable overpressure is applied in the annular space; and
   a bearing assembly by which the shaft is coupled to the stator assembly such that the shaft can rotate relative to the stator assembly.

16. The rotation transmission apparatus according to claim 15, wherein the sealing elements comprise at least one radial shaft sealing ring having a radially arranged sealing lip or sealing disc.

17. The rotation transmission apparatus according to claim 16, wherein the at least one radial shaft sealing ring comprises an outer region facing the stator assembly and an inner region facing the shaft, wherein the radial shaft sealing ring is connected to the stator assembly by a clamping connection.

18. The rotation transmission apparatus according to claim 17, wherein the inner region or the radial shaft sealing ring facing the shaft is configured as a sealing lip or sealing disc which extends radially around the shaft and bears against a sealing sleeve fastened to the shaft.

19. The rotation transmission apparatus according to claim 18, wherein the sealing sleeve has a sealing geometry, wherein the sealing geometry comprises at least one region which extends radially around the shaft and projects or protrudes in the direction of the annular space.

20. The rotation transmission apparatus according to claim 18, wherein the sealing lip or sealing disc is arranged in the annular space such that, when the annular space is unpressurized, the sealing lip or sealing disc has no contact with the sealing geometry of the sealing sleeve or only bears against the sealing geometry of the sealing sleeve of the shaft in a way such that, upon rotation of the shaft relative to the stator assembly, the sealing sleeve can slide over the sealing lip or sealing disc without resistance or at least substantially without resistance.

* * * * *